(12) United States Patent
Naswa et al.

(10) Patent No.: US 10,872,185 B1
(45) Date of Patent: Dec. 22, 2020

(54) SYSTEMS AND METHODS FOR ESTIMATING WIRE CAPACITANCE IN A REGISTER-TRANSFER LEVEL CIRCUIT DESIGN

(71) Applicant: Ansys, Inc., Canonsburg, PA (US)

(72) Inventors: Seema Naswa, Noida (IN); Praveen Singhal, Noida (IN); Paul Traynar, Banbury (GB)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/441,335

(22) Filed: Jun. 14, 2019

Related U.S. Application Data

(60) Provisional application No. 62/685,518, filed on Jun. 15, 2018.

(51) Int. Cl.
| | |
|---|---|
| *G06F 17/50* | (2006.01) |
| *G06F 30/30* | (2020.01) |
| *G06F 119/06* | (2020.01) |
| *G06F 119/12* | (2020.01) |
| *G06F 119/10* | (2020.01) |

(52) U.S. Cl.
CPC .......... *G06F 30/30* (2020.01); *G06F 2119/06* (2020.01); *G06F 2119/10* (2020.01); *G06F 2119/12* (2020.01)

(58) Field of Classification Search
CPC .. G06F 30/30; G06F 2119/06; G06F 2119/12; G06F 2119/10
See application file for complete search history.

(56) References Cited

U.S. PATENT DOCUMENTS

| | | | |
|---|---|---|---|
| 6,865,526 B1 * | 3/2005 | Henkel | G06F 30/33 703/18 |
| 9,892,227 B1 * | 2/2018 | Bisht | G06F 30/33 |
| 10,133,839 B1 * | 11/2018 | Vanukuri | G06F 30/367 |
| 2006/0294480 A1 * | 12/2006 | Makino | G06F 30/367 716/104 |
| 2008/0098340 A1 * | 4/2008 | Oh | G06F 30/392 716/111 |

* cited by examiner

*Primary Examiner* — Nghia M Doan
(74) *Attorney, Agent, or Firm* — Jones Day

(57) ABSTRACT

Example systems and methods are disclosed for estimating wire capacitance in an RTL circuit design. In an embodiment, a reference post-layout design is received from a non-transitory storage medium, and gate-level nets within the reference post-layout design are classified as either long nets or short nets based, at least in part, on an average fanout length within the gate-level net. A parasitic model may be generated for each of the gate-level nets, and the gate-level nets and associated parasitic models may be stored within either a long net database or a short net database based on the classification of the gate-level net. A net from the RTL circuit design may be classified as either long or short based, at least in part, on a number of modules crossed by one or more fanouts within the net. If the net from the RTL circuit design is classified as long, then capacitance for the net may be estimated using a parasitic model selected from the long net database. If the net from the RTL circuit design is classified as short, then capacitance for the net may be estimated using a parasitic model selected from the short net database.

17 Claims, 8 Drawing Sheets

US 10,872,185 B1

SYSTEMS AND METHODS FOR ESTIMATING WIRE CAPACITANCE IN A REGISTER-TRANSFER LEVEL CIRCUIT DESIGN

This application claims priority to U.S. Provisional Application No. 62/685,518 filed on Jun. 15, 2018, titled "Systems and Methods for Estimating Wire Capacitance in a Register-Transfer Level Circuit Design," the entirety of which is herein incorporated by reference.

TECHNICAL FIELD

The technology described herein relates generally to computer-aided design (CAD) tools and more particularly to systems and methods for estimating wire capacitance in a register-transfer level (RTL) circuit design.

BACKGROUND

In recent years, power consumption has become a key design metric for integrated circuit designs. Power consumption can generally be measured accurately at later stages of circuit design (e.g., after placement and routing), but then it may be too late to make architectural changes to the circuit design for reducing power consumption. Power estimation at the RTL stage can be more efficient for optimizing power consumption because at the RTL stage there is typically enough flexibility to make high-impact changes to achieve lower power consumption. Providing an accurate power estimation at the RTL stage, however, can be challenging. Part of this challenge is accurately estimating wire capacitance at an RTL circuit design without first performing physical synthesis and placement and routing operations.

SUMMARY

Example systems and methods are disclosed for estimating wire capacitance in an RTL circuit design. In an embodiment, a reference post-layout design is received from a non-transitory storage medium, and gate-level nets within the reference post-layout design are classified as either long nets or short nets based, at least in part, on an average fanout length within the gate-level net. A parasitic model may be generated for each of the gate-level nets, and the gate-level nets and associated parasitic models may be stored within either a long net database or a short net database based on the classification of the gate-level net. A net from the RTL circuit design may be classified as either long or short based, at least in part, on a number of modules crossed by one or more fanouts within the net. If the net from the RTL circuit design is classified as long, then capacitance for the net may be estimated using a parasitic model selected from the long net database. If the net from the RTL circuit design is classified as short, then capacitance for the net may be estimated using a parasitic model selected from the short net database.

DETAILED DESCRIPTION

A register-transfer level (RTL) description of an integrated circuit describes the circuit's registers and the sequence of transfers between the registers. Accurate power models are generally not available for components of an RTL description. Instead, accurate power models are usually only available for standard cells of a gate-level design (i.e., a physical design.) A gate-level design is a circuit description that is specified at a lower level of abstraction than an RTL description and comprises instances of standard cells and signal nets that connect the standard cells.

Figure 1:
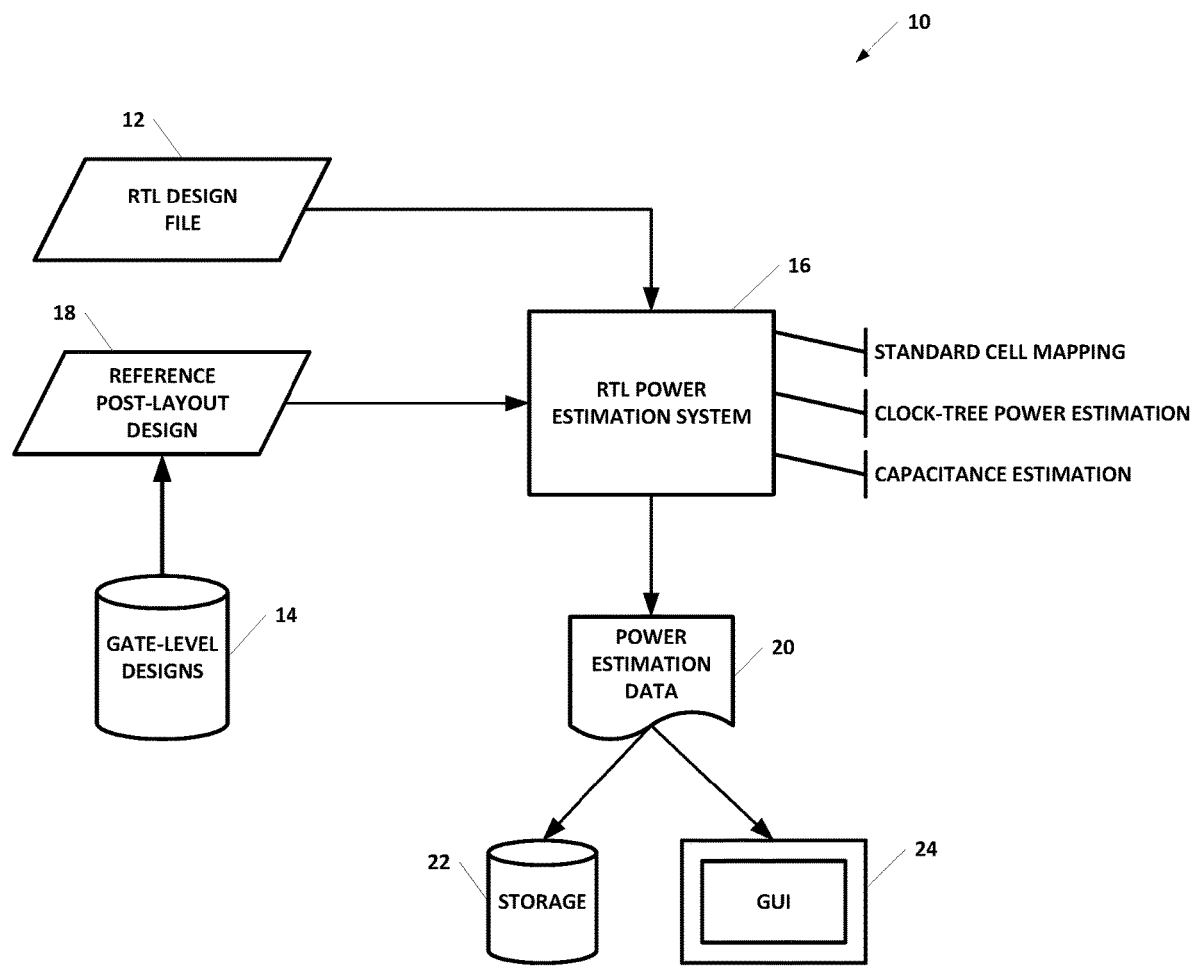
FIG. 1 depicts a block diagram of an example system for estimating power consumption in an RTL level circuit design based on one or more existing gate-level designs.

FIG. 1 is a block diagram of an example system 10 for estimating power consumption in an RTL level circuit design 12 based on one or more existing gate-level designs 14 generated in a previous design process. The approaches described herein enable reuse of existing gate-level designs 14 for the purpose of estimating power characteristics of a new RTL design 12.

In the illustrated embodiment, the RTL circuit design 12 is input to an RTL power estimation system 16 along with a reference post-layout design 18 selected from among the stored previous gate-level designs 14. The reference post-layout design 18 may, for example, be an older version of the current design. As another example, the reference post-layout design 18 may be of a similar design style as the current design at a same technology node. The RTL power estimation system 16 may, for example, include software stored on one or more non-transitory computer readable medium and executable by one or more processors.

The RTL power estimation system 16 utilizes the reference post-layout design 18 to generate power estimation data 20 for the RTL circuit design 12. The power estimation data 20 may, for example, be stored in a non-transitory computer readable medium 22 and/or displayed on a graphical user interface (GUI) 24 executing on a computer, for example in the form of one or more power estimation reports. In embodiments, the RTL power estimation system 16 generates the power estimation data 20 by generating one or more physical power models based on the reference post-layout design 18, and then applying the one or more physical power models to the RTL circuit design. To generate the one or more physical power models, the RTL power estimation system 16 may perform a standard cell mapping process, a clock-tree power estimation process, and a capacitance estimation process.

The standard cell mapping process is used by the RTL power estimation system 16 to map (i.e., associate) standard cells from the existing gate-level designs 14 with leaf-level instances of the RTL circuit design 12. The power characteristic of an RTL netlist may then be determined based on the gate-level standard cells that are associated with the leaf-level instances of the RTL circuit design 12. A system and method that may be used by the RTL power estimation system 16 to map gate-level standard cells with leaf-level instances of the RTL circuit design 12 and to determine power characteristics of an RTL netlist based on the associated standard cells is described in commonly-owned U.S. patent application Ser. No. 15/227,512, titled "Systems and Methods for Estimating a Power Consumption of a Register-Transfer Level Circuit Design," which is incorporated by reference herein.

The clock-tree power estimation process is used by the RTL power estimation system 16 to construct a virtual clock tree for the RTL circuit design 12 based on the reference post-layout design 18. At the RTL stage 12, a clock net may drive a very large number of clocked devices. In the physical world, it is infeasible for a clock driver to drive that many loads. Hierarchies of buffers are therefore added during physical synthesis of the RTL design to fan out the clock from its source to the clock pins of certain sinks. The virtual clock tree generated by the RTL power estimation system 16 is thus used to provide an estimate of the power that will be consumed by the clock system in the RTL circuit design 12 after it undergoes physical synthesis. One example of a system and method that may be utilized by the RTL power estimation system 16 for clock tree power estimation at the RTL level is described in commonly-owned U.S. Pat. No. 9,892,227, entitled "Systems, Methods and Storage Media for Clock Tree Power Estimation at Register Transfer Level," which is incorporated herein by reference.

Example systems and methods that may be utilized by the RTL power estimation system 16 for estimating the capacitance of the RTL circuit design 12 are described below with reference to FIGS. 2-5. Specifically, the systems and methods depicted in FIGS. 2-5 may be used by the RTL power estimation system 16 to estimate wire capacitance of the RTL circuit design 12 based on the parasitic data of the reference post-layout design 18, without requiring physical synthesis or placement and routing of the RTL circuit design 12. The systems and methods described herein may utilize the capacitance of nets and physical locations of pins in the reference post-layout design 18 to formulate the variation of wire capacitance with wire length. Wire capacitance estimated based on this formulation may, for example, be more accurate than wire capacitance estimated based on wireload models and fanout count, leading to a more accurate dynamic power estimation of the RTL circuit design 12.

Figure 2:
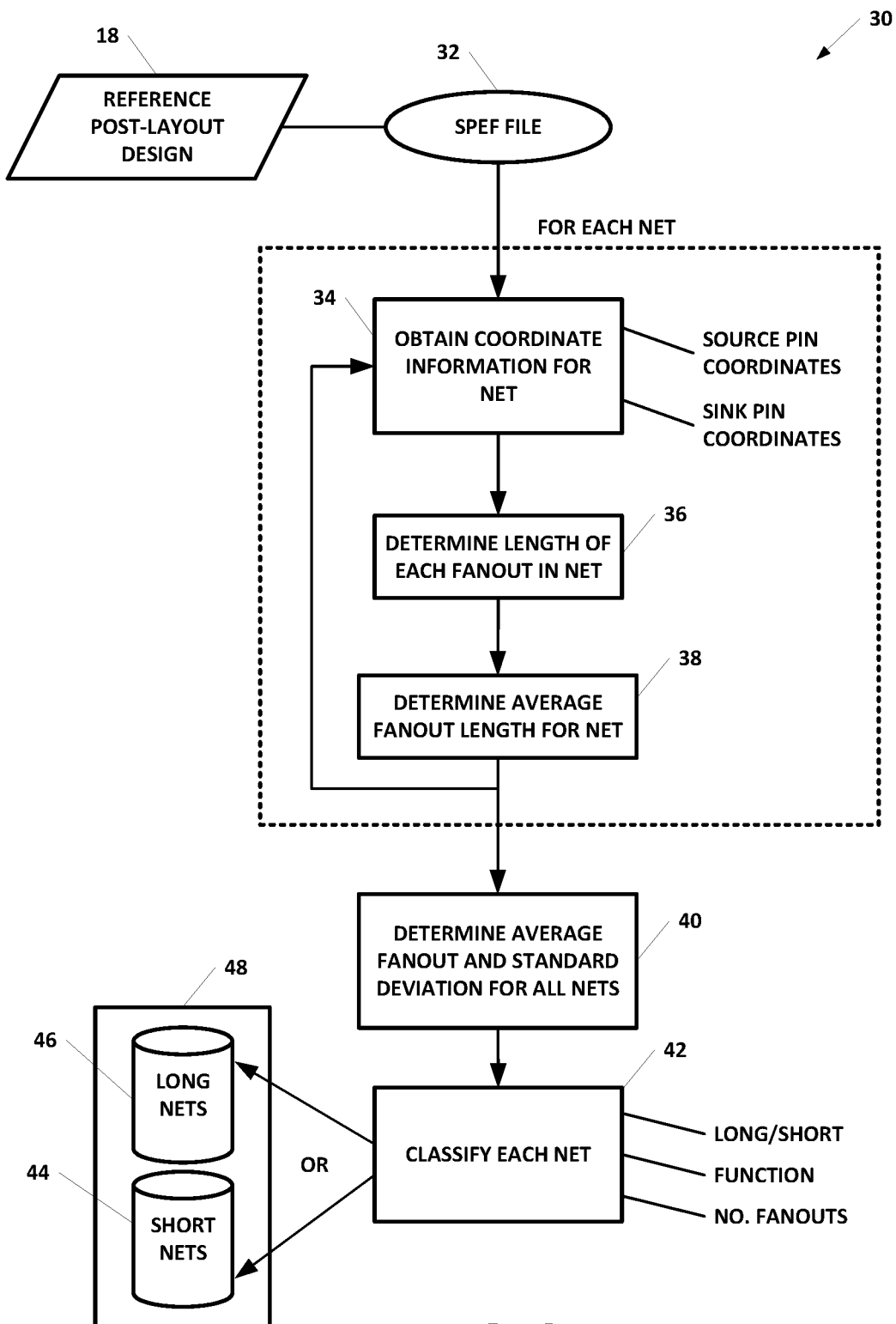
FIG. 2 is a diagram of an example system and method for classifying nets in a reference post-layout design.

FIG. 2 is a diagram of an example system and method 30 for classifying nets in the reference post-layout design 18. The parasitic data of a reference post-layout design 18 is provided as a Standard Parasitic Exchange Format (SPEF) input 32. The SPEF input 32 may, for example, be provided by the user along with the gate-level netlist and libraries. The SPEF file is used to determine the coordinates of source and sink pins for each net in the gate netlist of the reference post-layout design 18, and this coordinate information is used to classify each net as either a short net 44 or a long net 46.

At step 34, the SPEF file is accessed to determine the coordinates of source and sink pins for a net in the gate netlist of the reference post-layout design 18. An example of a portion of code for a net in a SPEF file is set forth below:

*D_NET regcontrol_top/GRC/n13345 1.94482
*CONN
*I regcontrol_top/GRC/U9743:E I *C 537.855 9150.11
*L 3.70000
*I regcontrol_top/GRC/U9409:A I *C 540.735 9146.02
*L 5.40000
*I regcontrol_top/GRC/U9407:Z O *C 549.370 9149.88
*D OR2M1P The above SPEF file code example is for a net identified as "regcontrol_top/GRC/n13345." The code element "*C" denotes x, y coordinates. The code element "*D" denotes a driver. "Z" is the output pin (O) of instance after "regcontrol_top/GRC/U9407." The above example includes a net with two sink pins (I) and one source pin (O), and thus two fanouts. The x,y coordinates for the two source pins (I) in the above example are ("537.855", "9150.11") and ("540.735," "9146.02") respectively. The x,y coordinates for the sink pin (O) in the above example are ("549.370", "9149.370).

With reference again to FIG. 2, the length of each fanout in the net is determine from the coordinate information at step 36. The length of a fanout (Ln) may, for example, be determined using the formula: $Ln=\Delta y+\Delta x$. For instance, in the code example set forth above, the length of the first fanout is $L_1=|549.370-537.855|+|9149.37-9150.11|=12.255$, and the length of the second fanout is $L_2=|1549.37-540.735|+|9149.37-9146.02|=11.985$. The average fanout length for the net is then determined at step 38. The average length of a fanout for a net may, for example, be determined using the formula:

$$L = \sum_{i=1}^{n} Li/n,$$

where n is the number of fanouts in the net. For instance, in the code example set forth above, the average fanout length for the net is $L=(12.255+11.985)/2=12.12$ Steps 34-38 are repeated until the average fanout length, L, has been determined for each net in the gate netlist for the reference post-layout design 18. The dotted box in FIG. 2 signifies that steps 34-38, included within the dotted box, are performed for each net in the gate netlist. Once the average fanout length, L, has been determined for each net, the procedure progresses to step 40.

At step 40, the overall average fanout length, Lavg, of all of the nets in the gate netlist for the reference post-layout design 18 is determined. In addition, the standard deviation (sd) between the average fanout lengths (L) for each net in the gate netlist is also determined at step 40.

At 42, each net in the gate netlist is classified as either a short net or a long net. In an embodiment, a net may be classified as a short net if the difference between the average fanout length (L) for the net and the overall average fanout length (Lavg) for the gate netlist is less than the standard deviation (sd), i.e., if L−Lavg<sd. Otherwise, the net may be classified as a long net (i.e., if L−Lavg≥sd). It should be understood that in other embodiments, one or more criteria other than the average fanout length and/or standard deviation could be used to classify a net as short or long.

In addition, each net may be further classified at step 42 based on other criteria, such as the total number of fanouts in the net and the functional category of the net (e.g., clock net, logic operator, latch, etc.) The classified nets are stored to one or more databases 48. For example, databases 44, 46 may be built for each of the two wire types (long and short), as illustrated in FIG. 2.

Figure 3:
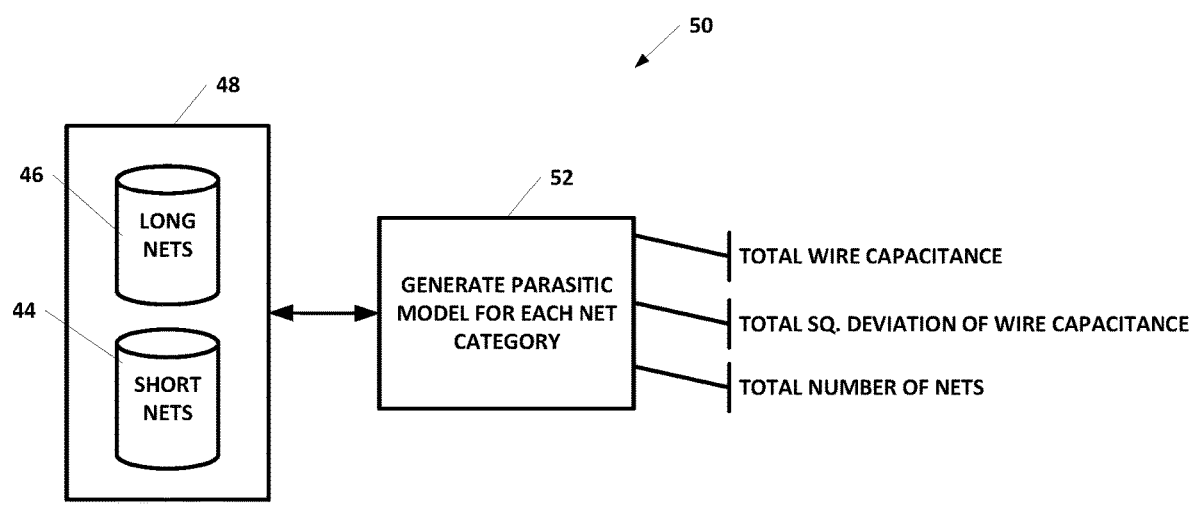
FIG. 3 is a block diagram of an example system and method for generating parasitic models from gate-level nets.

FIG. 3 is a block diagram of an example system and method 50 for generating parasitic models from the classified gate-level nets. In the illustrated example, a parasitic model generation system 52 is used to build a parasitic model for each of the multiple net categories created during the classification step (step 42) in FIG. 2. The parasitic models may, for example, be created based on the fanout count, functional category and long/short classification. The parasitic model generation system 52 iterates over all gate-level nets and establishes their wire capacitance. Depending upon whether the net has been classified long or short, and depending upon the number of fan-outs and functional category, the net's wire capacitance is added to the corresponding parasitic model. The parasitic model generation system 52 may then determine the total squared deviation of wire capacitance and the total number of nets for each parasitic model. Using the determined parasitic information, e.g., total wire capacitance, total squared deviation of wire capacitance and total number of nets, parasitic models may be created for each functional category (e.g., clock net, logic operator, latch, etc.) in both the long net and short net databases 44, 46. The parasitic models may, for example, be stored in the databases 44, 46 in association with their respective net classifications.

Figure 4:
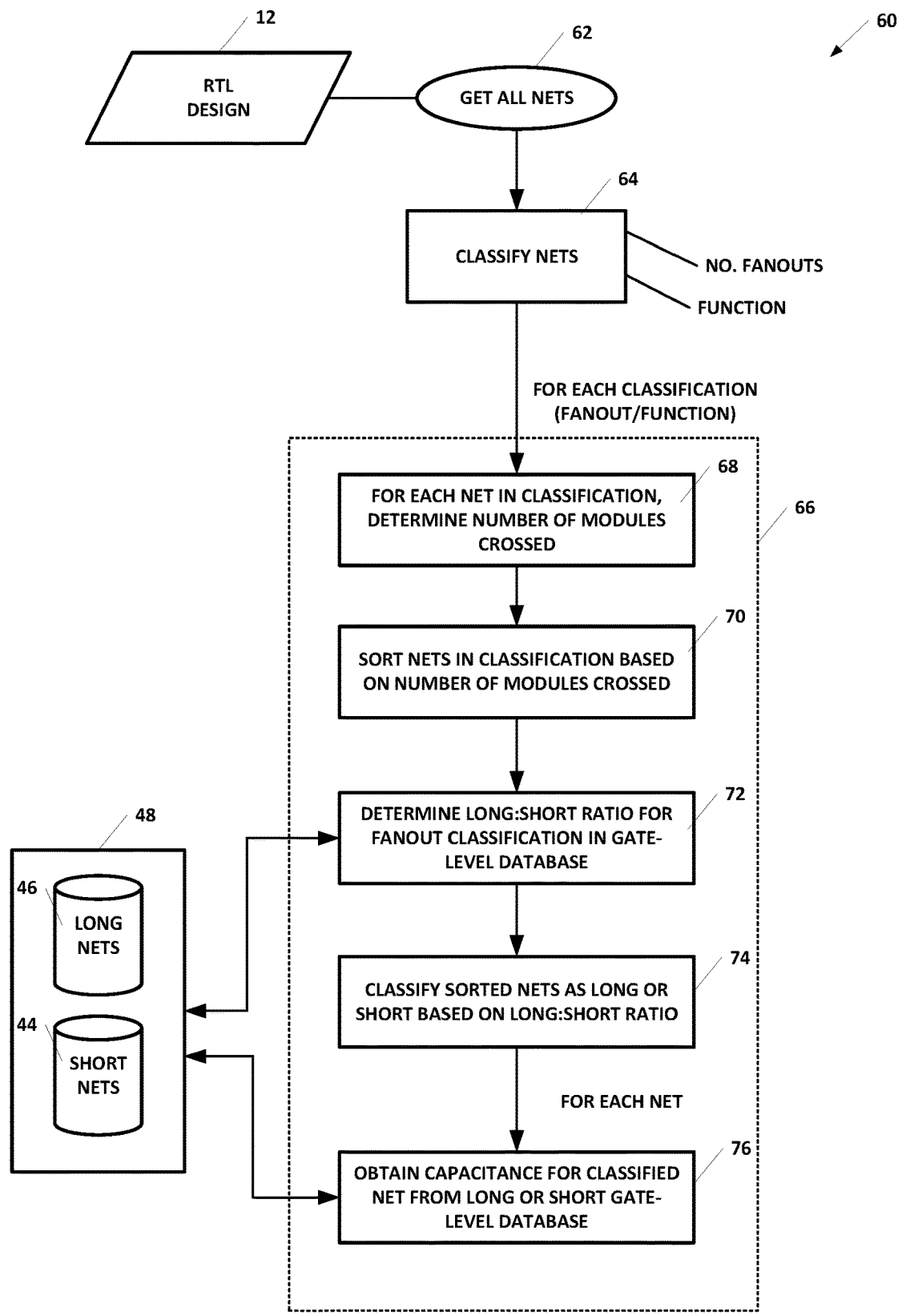
FIG. 4 is a block diagram of an example system and method for estimating capacitance for nets in an RTL circuit design.

FIG. 4 is a block diagram of an example system and method 60 for estimating capacitance for nets in the RTL circuit design 12 using the parasitic models for the classified gate-level nets 44, 46. The method 60 depicted in FIG. 4 may, for example, be used by the RTL power estimation system 16 of FIG. 1 during dynamic power estimation of the RTL circuit design 12. The method 60 is used to classify nets in the RTL-level design 12 into long and short nets based on the number of module hierarchies crossed while maintaining the same distribution of long and short nets established in the net classification databases 44, 46 for the gate-level reference post-layout design 18. The stored parasitic models for the classified gate-level nets 44, 46 may then be used to estimate the capacitance of each net in the RTL design 12.

At step 62, all of the nets are acquired from the RTL circuit design 12. Each of the nets is then classified at step 64 based on the number of fanouts and functional category (e.g., clock net, logic operator, latch, etc.) The operations depicted within the dotted box 66 are then performed for each fanout/function classification to estimate the capacitance of each net in the RTL circuit design 12.

At step 68, for each net in the fanout/function classification, each fanout of the net is processed to determine the number of modules (circuit elements) that are crossed from a common ancestor. The number of crossed modules is accumulated for all of the fanouts and added as an attribute of the net. Then, at step 70 all of the nets within the fanout/function classification are sorted (e.g., in ascending order) based on the crossed modules attribute.

At step 72, the gate-level net ratio of long to short nets (long:short nets) for the current fanout/function classification is determined from the nets stored in the gate-level net databases 44, 46. The sorted RTL nets are then classified as either long or short based on the gate-level long:short net ratio, thus maintaining the same distribution of long and short nets established in the net classification databases 44, 46 for the gate-level reference post-layout design 18. For example, if the ratio of gate-level long to short nets is 1:4, then the sorted RTL nets would be classified such that there is 1 long net for every 4 short net. For instance if the sorted RTL nets are listed in ascending order, then the following process may be used to classify the nets as either long or short nets using the example 1:4 ratio (with short nets being classified starting at the top of the sorted list and long nets being classified starting at the bottom of the sorted list):

Initialize start=0, end=size−1
Repeat till end>start
Mark start+4 nets to short nets
Mark end−1 nets to long nets Once all of the nets within the fanout/function classification have been classified as either long or short nets, the capacitance for each net may be estimated using the parasitic model for the particular fanout/function classification from the appropriate long or short gate-level net database 44, 46.

The process depicted within dotted box 66 is repeated for each fanout/function classification until the capacitance has been estimated for each net in the RTL circuit design 12.

Figure 5:
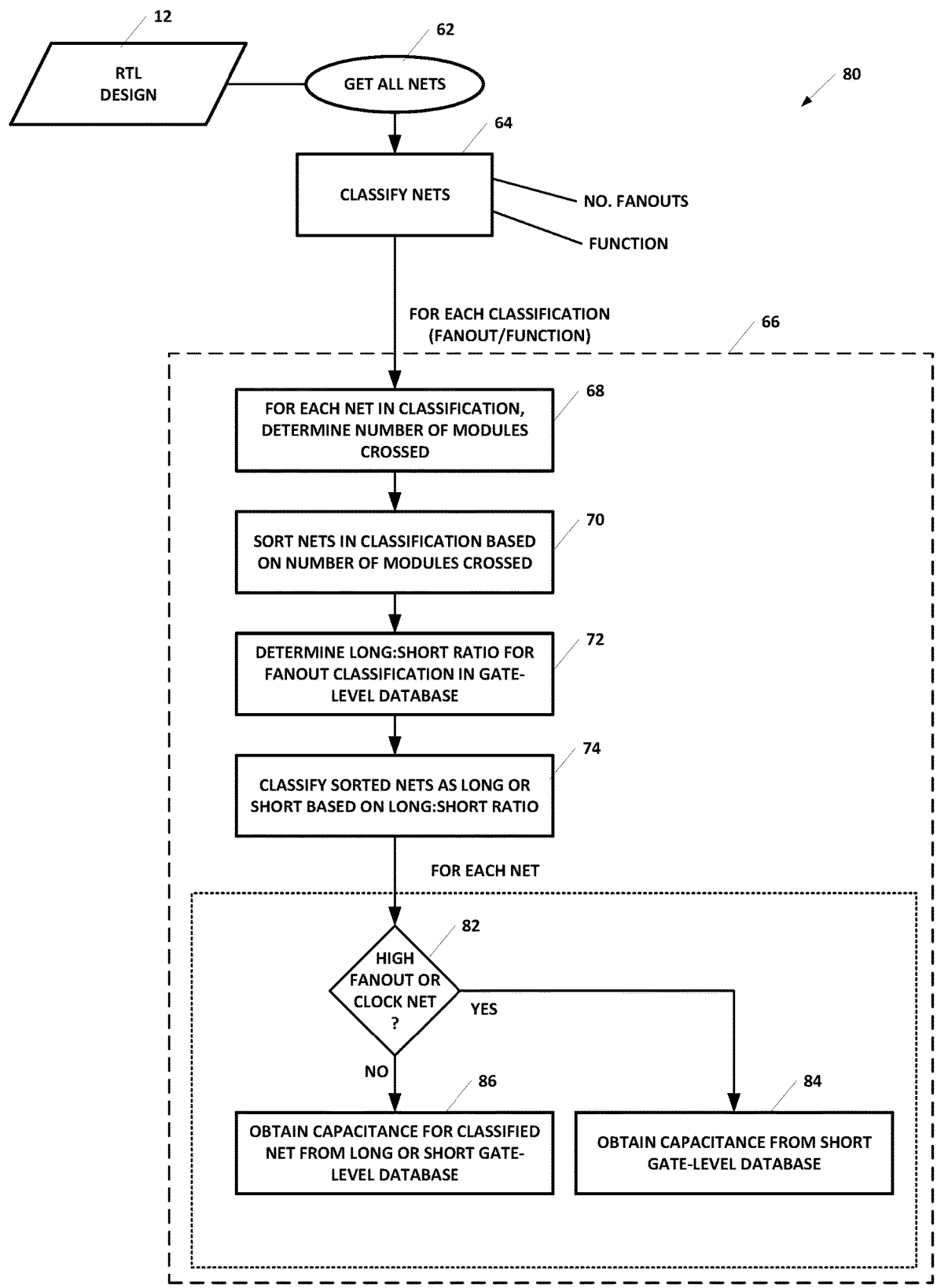
FIG. 5 is a block diagram of another example system and method for estimating capacitance for nets in an RTL circuit design.

FIG. 5 is a block diagram of another example system and method 80 for estimating capacitance for nets in the RTL circuit design 12 using the parasitic models for the classified gate-level nets. Operations 62-74 in the example method 80 shown in FIG. 5 are the same as described above with reference to FIG. 4. (The gate-level net databases 44, 46 are omitted from FIG. 5 for simplicity.) In this example, however, after the nets within the fanout/function classification have been sorted at step 74, steps 82-86 are repeated to estimate the capacitance for each net within the fanout/function classification.

At step 82, the method 80 determines whether the RTL net falls within a fanout and/or function classification that has been predetermined to be limited to short nets. For example, it may be assumed that all clock net buffers and/or all high fanout buffers will be placed close to their respective loads, and thus can be assumed to have short nets. If an RTL net is determined to be within such a predetermined short net category, then net capacitance is estimated at step 84 using a parasitic model from the short gate-level net database 44. Otherwise, the capacitance of the RTL net is determined based on a parasitic model obtained from the appropriate long or short gate-level net database 44, 46, as described above with reference to step 76 of FIG. 4.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 6, 7A, 7B and 7C.

Figure 6:
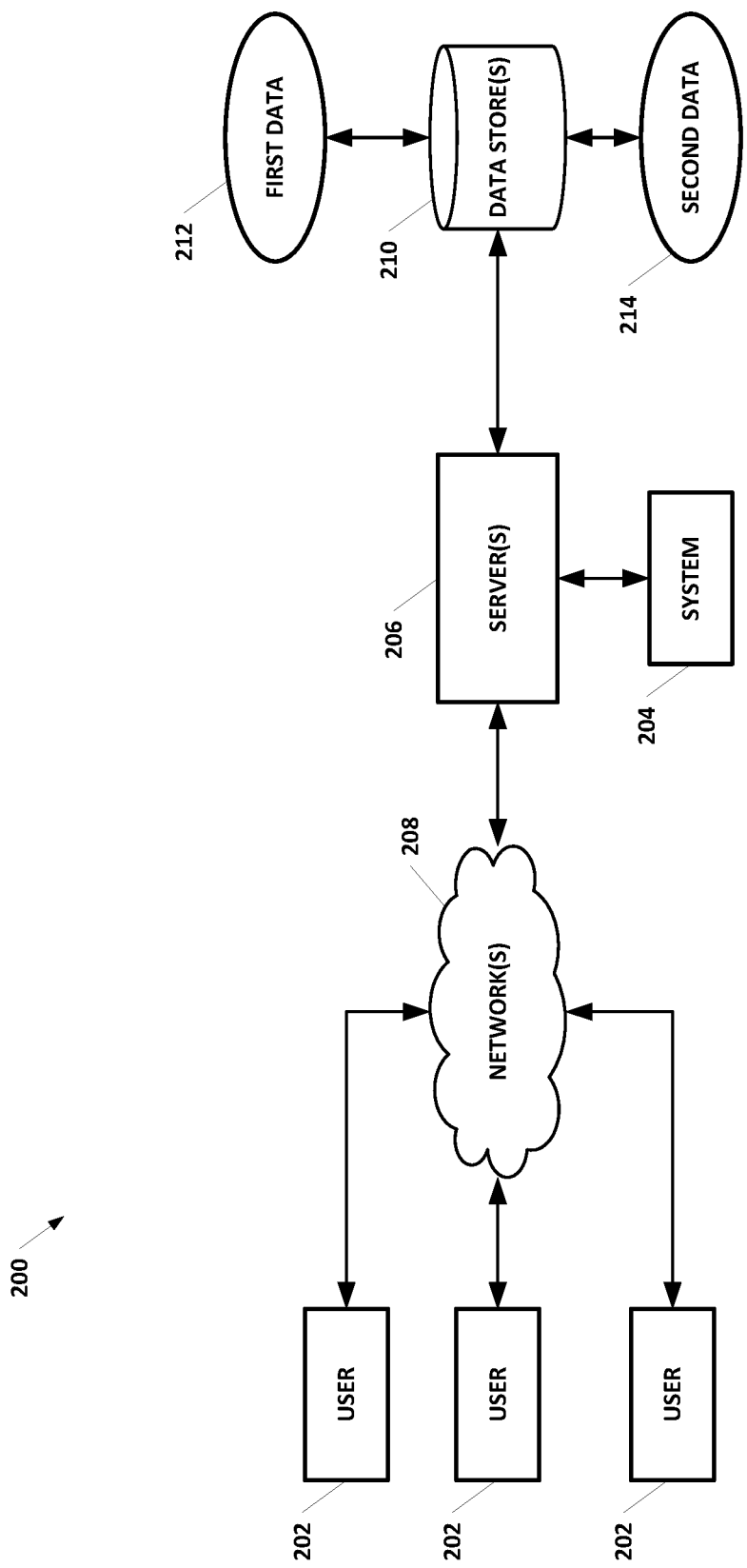
FIGS. 6, 7A, 7B and 7C depict example systems that may be used to implement the technology disclosed herein.

FIG. 6 depicts at 200 a computer-implemented environment wherein users 202 can interact with a system 204 hosted on one or more servers 206 through a network 208. The system 204 contains software operations or routines. The users 202 can interact with the system 204 through a number of ways, such as over one or more networks 208. One or more servers 206 accessible through the network(s) 208 can host system 204. It should be understood that the system 204 could also be provided on a stand-alone computer for access by a user.

Figure 7A:
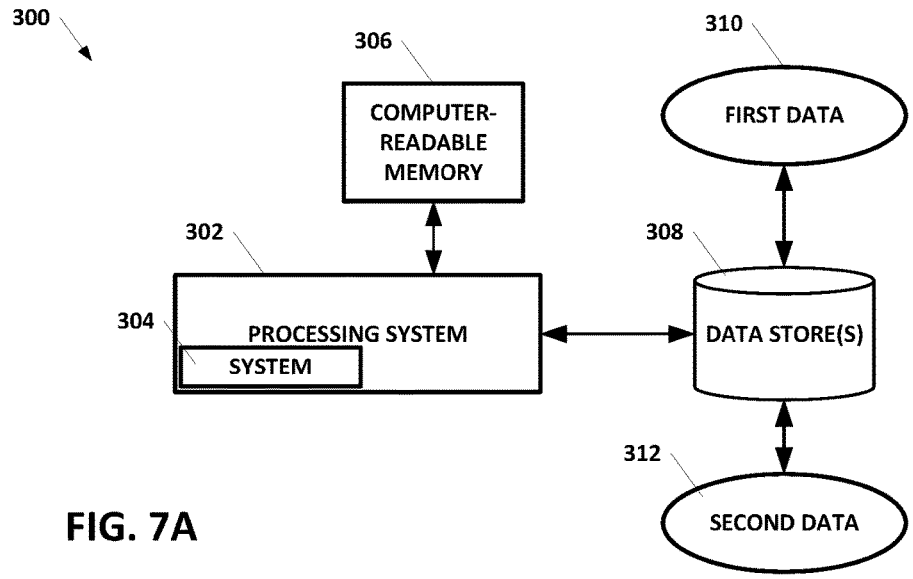
Figure 7B:
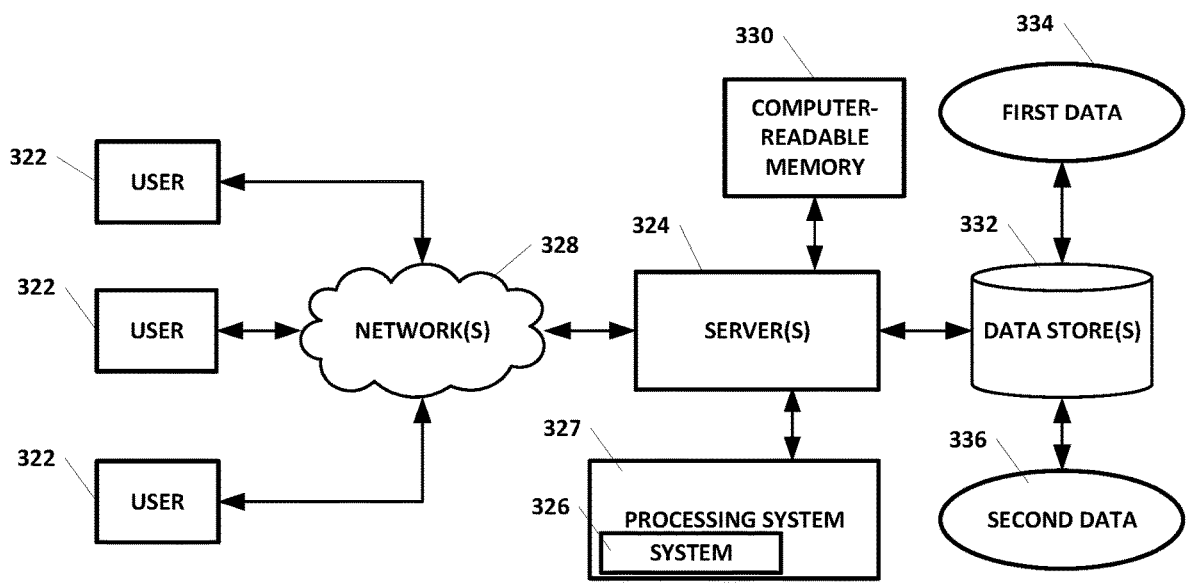
Figure 7C:
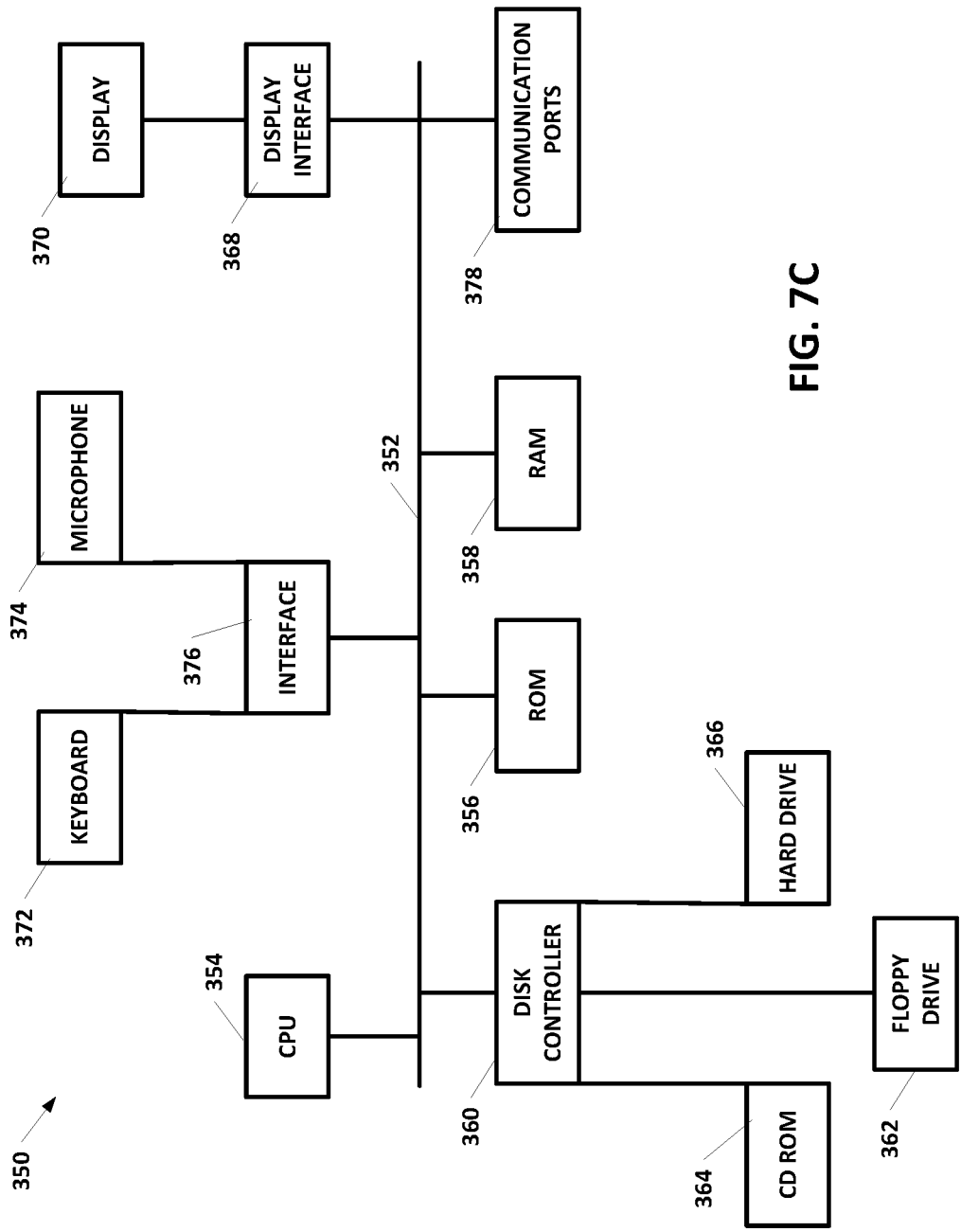

FIGS. 7A, 7B, and 7C depict example systems for use in implementing a system. For example, FIG. 7A depicts an exemplary system 300 that includes a standalone computer architecture where a processing system 302 (e.g., one or more computer processors) includes a system 304 being executed on it. The processing system 302 has access to a non-transitory computer-readable memory 306 in addition to one or more data stores 308. The one or more data stores 308 may contain first data 310 as well as second data 312.

FIG. 7B depicts a system 320 that includes a client server architecture. One or more user PCs 322 accesses one or more servers 324 running a system 326 on a processing system 327 via one or more networks 328. The one or more servers 324 may access a non-transitory computer readable memory 330 as well as one or more data stores 332. The one or more data stores 332 may contain first data 334 as well as second data 336.

FIG. 7C shows a block diagram of exemplary hardware for a standalone computer architecture 350, such as the architecture depicted in FIG. 7A, that may be used to contain and/or implement the program instructions of system embodiments of the present disclosure. A bus 352 may serve as the information highway interconnecting the other illustrated components of the hardware. A processing system 354 labeled CPU (central processing unit) (e.g., one or more computer processors), may perform calculations and logic operations required to execute a program. A non-transitory computer-readable storage medium, such as read only memory (ROM) 356 and random access memory (RAM) 358, may be in communication with the processing system 354 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 360 interfaces one or more disk drives to the system bus 352. These disk drives may be external or internal floppy disk drives such as 362, external or internal CD-ROM, CD-R, CD-RW or DVD drives such as 364, or external or internal hard drives 366.

Each of the element managers, real-time data buffer, conveyors, file input processor, database index shared access memory loader, reference data buffer and data managers may include a software application stored in one or more of the disk drives connected to the disk controller 360, the ROM 356 and/or the RAM 358. Preferably, the processor 354 may access each component as required.

A display interface 368 may permit information from the bus 356 to be displayed on a display 370 in audio, graphic, or alphanumeric formal. Communication with external devices may occur using various communication ports 378.

In addition to the standard computer-type components, the hardware may also include data input devices, such as a keyboard 372, or other input device 374, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A method for estimating capacitance of a net in a register-transfer level (RTL) circuit design, comprising:
   determining, by a processor, an average fanout length for each respective gate-level net within a reference post-layout design for the RTL circuit design, wherein the average fanout length is determined based on coordinate information identifying source and sink pins for the respective gate-level nets within the reference post-layout design;
   determining, by the processor, an overall average fanout length and a standard deviation for the gate-level nets within the reference post-layout design
   classifying, by the processor, a gate-level net within the reference post-layout design based on a difference between an average fanout length for the gate-level net and the overall average fanout length with the standard deviation;
   generating, by the processor, a parasitic model for the gate-level net, the parasitic model identifying a total wire capacitance;
   storing the model in a database according to the classification of the gate-level net;
   classifying, by the processor, a net from the RTL circuit design based on a number of modules crossed by one or more fanouts within the net from the RTL circuit design; and
   selecting the parasitic model in the database to estimate capacitance for the net from the RTL circuit design, wherein the parasitic model in the database is selected based on the classification of the gate-level net and the classification of the net from the RTL circuit design.

2. The method of claim 1, wherein the parasitic model for the gate-level net further identifies a total square deviation of wire capacitance within the gate-level net.

3. The method of claim 1, wherein the parasitic model for the gate-level net further identifies a total number of nets within the RTL circuit design.

4. The method of claim 1, wherein the gate-level net is further classified within the database based on a total number of fanouts and a net function.

5. The method of claim 4, further comprising:
   further classifying the net from the RTL circuit design based on a total number of fanouts and a net function;
   wherein the further classification is used in selecting the parasitic model from the database.

6. The method of claim 1, wherein classifying the net from the RTL circuit design further comprises:
   sorting a plurality of nets from the RTL circuit design based on an indicator of wire length within each of the plurality of nets;

determining a ratio of long to short nets stored within the database; and classifying the sorted plurality of nets as either long or short to maintain the ratio of long to short nets.

7. The method of claim 1, wherein the database comprises a long net database configured to store long net parasitic models and a short net database configured to store short net parasitic models.

8. A system for estimating capacitance of a net in a register-transfer level (RTL) circuit design, comprising:

one or more non-transitory storage medium storing a reference post-layout design for the RTL circuit design;

RTL power estimation software stored on the one or more non-transitory storage medium and executable by one or more processors, the RTL power estimation software when executed being configured to, determine an average fanout length for each respective gate-level net within the reference post-layout design, wherein the average fanout length is determined based on coordinate information identifying source and sink pins for the respective gate-level nets within the reference post-layout design;

determine an overall average fanout length and a standard deviation for the gate-level nets within the reference post-layout design classify a gate-level net within the reference post-layout design based on a difference between an average fanout length for the gate-level net and the overall average fanout length with the standard deviation, generate a parasitic model for the gate-level net, the parasitic model identifying a total wire capacitance;

store the parasitic model in a database according to the classification of the gate-level net, classify a net from the RTL circuit design based on a number of modules crossed by one or more fanouts within the net from the RTL circuit design, and select the parasitic model in the database to estimate capacitance for the net from the RTL circuit design, wherein the parasitic model in the database is selected based on the classification of the gate-level net and the classification of the net form the RTL circuit design.

9. The system of claim 8, wherein the parasitic model for the gate-level net further identifies a total square deviation of wire capacitance within the gate-level net.

10. The system of claim 8, wherein the parasitic model for the gate-level net further identifies a total number of nets within the RTL circuit design.

11. The system claim 8, wherein the gate-level net is further classified based on a total number of fanouts and a net function.

12. The system of claim 11, wherein the RTL power estimation software is further configured to:

further classify the net from the RTL circuit design based on a total number of fanouts and a net function, wherein the further classification is used in selecting the parasitic model.

13. The system of claim 8, wherein classifying the net from the RTL circuit design further comprises:

sorting a plurality of nets from the RTL circuit design based on an indicator of wire length within each of the plurality of nets;

determining a ratio of long to short nets stored within the database;

classifying the sorted plurality of nets as either long or short to maintain the ratio of long to short nets.

14. A non-transitory computer-readable storage medium comprising instructions for which when executed cause a processing system to execute steps comprising:

determining, by the processor, an average fanout length for each respective gate-level net within a reference post-layout design for the RTL circuit design, wherein the average fanout length is determined based on coordinate information identifying source and sink pins for the respective gate-level nets within the reference post-layout design;

determining, by the processor, an overall average fanout length and a standard deviation for the gate-level nets within the reference post-layout design classifying, by the processor, a gate-level net within the reference post-layout design based on a difference between an average fanout length for the gate-level net and the overall average fanout length with the standard deviation;

generating, by the processor, a parasitic model for the gate-level net, the parasitic model identifying a total wire capacitance;

storing the parasitic model in a database according to the classification of the gate-level net;

classifying, by the processor, a net from the RTL circuit design based on a number of modules crossed by one or more fanouts within the net from the RTL circuit design; and selecting the parasitic model in the database to estimate capacitance for the net from the RTL circuit design, wherein the parasitic model in the database is selected based on the classification of the gate-level net and the classification of the net from the RTL circuit design.

15. The non-transitory computer-readable storage medium of claim 14, wherein the parasitic model for the gate-level net further identifies a total square deviation of wire capacitance within the gate-level net.

16. The non-transitory computer-readable storage medium of claim 14, wherein the parasitic model for the gate-level net further identifies a total number of nets within the RTL circuit design.

17. The non-transitory computer-readable storage medium of claim 14, wherein classifying the net from the RTL circuit design as further comprises:

sorting a plurality of nets from the RTL circuit design based on an indicator of wire length within each of the plurality of nets;

determining a ratio of long to short nets stored within the database; and classifying the sorted plurality of nets as either long or short to maintain the ratio of long to short nets.

* * * * *